Patented Dec. 22, 1942

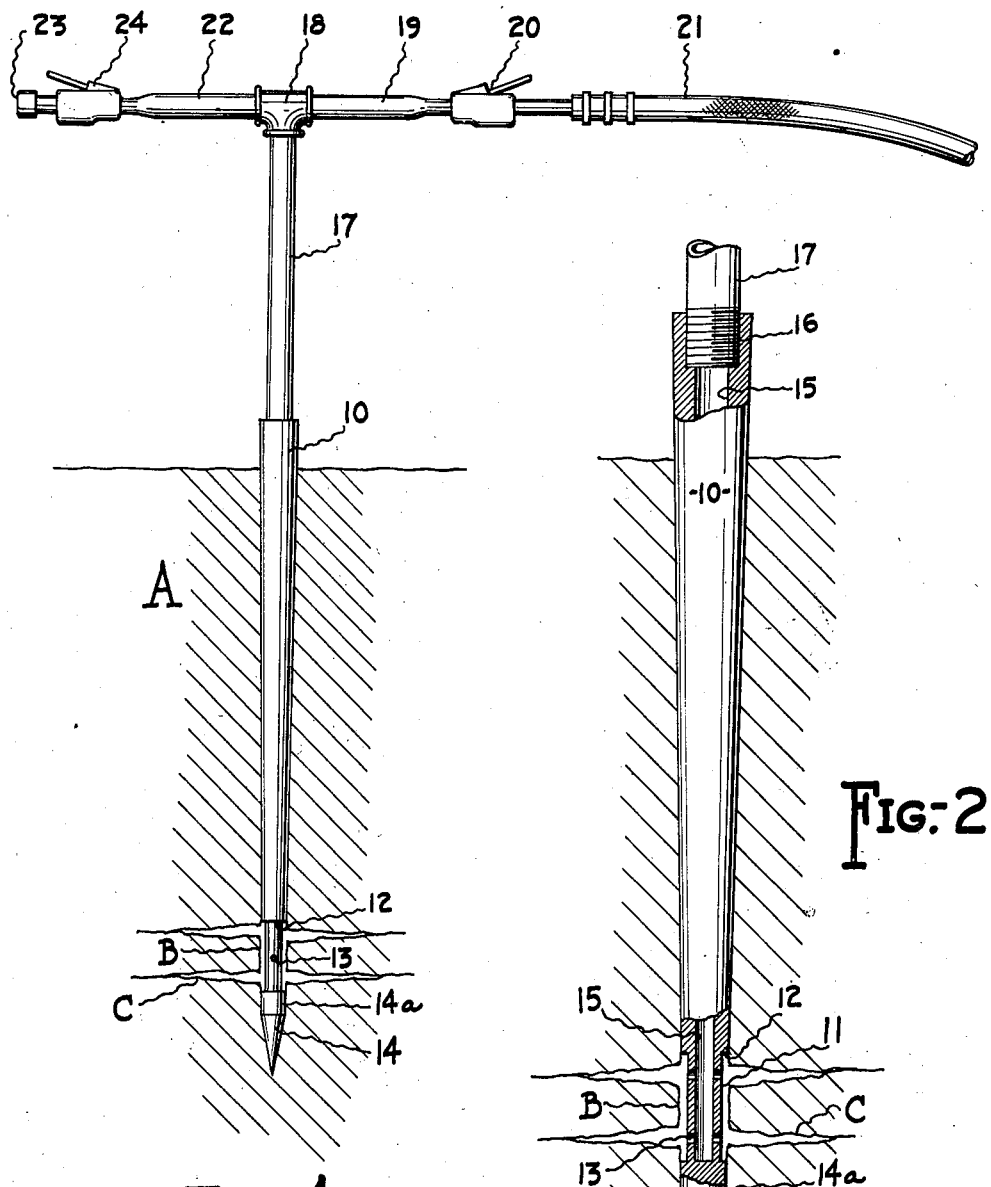

2,306,165

UNITED STATES PATENT OFFICE 2,306,165

APPARATUS FOR TREATING SOIL

Charles F. Irish, Bratenahl, Ohio

Application November 17, 1941, Serial No. 419,442

1 Claim. (Cl. 47—49)

This invention relates to a process of and apparatus for treating soil, and has for its general object to provide a process and apparatus whereby soil may be efficiently aerated and also treated with soil rectifying materials, such as powdered or liquid fungicides and insecticides, fertilizer, lime, sulphur, or other materials capable of correcting acidity and alkalinity and improving or protecting plant growth.

In each of my prior Patent Nos. 1,814,445, 1,814,446 and 2,083,153, there is shown and described a tool adapted for the aeration of soil, wherein the tool is incapable of being driven into the earth and wherein a hole of sufficient depth is pre-formed for the reception of the tool, the upper portion only of which hole forms a close and leak-proof fit with the portion of the tool therewithin, while an elongated space is provided between the said wall and the remainder of the tool into which space air discharged from the open lower end of the tube enters and, by its pressure against the surrounding wall, creates fissures or fractures in the soil for the reception of air and/or soil-rectifying material.

The tool comprising the subject matter of this application differs from those of my prior patents in that the lower end of the tubular portion of said tool is provided with a tapered point or spud, whereby the tool may be driven into the soil. All other tools of the type to which my invention relates and which are provided with points whereby they are capable of being driven are cylindrical in shape above said points and are provided with holes in their tubular bodies which admit air under pressure to separated limited areas of the walls surrounding the tools. In the tool shown and described herein, the tubular portion of the same comprises a tapered upper section and a cylindrical lower section of smaller diameter than the tapered section, said cylindrical section being provided with ports for the escape of air. The upper end of the spud and the lower end of the upper section are of the same contour and peripheral extent, the said ends being preferably circular in outline and of the same diameter, whereby the reduced section will be surrounded by a cylindrical wall of earth. In practice, the cylindrical section has been approximately three inches in length and the diameter of the earth wall surrounding the same has been approximately one inch. Due to this construction, a much larger area of earth wall is exposed to the pressure of the air than is possible with driven tools heretofore employed for soil-aerating and treating purposes.

In the drawing, Fig. 1 represents a side elevational view of a tool constructed in accordance with my invention, showing the same as embedded in the soil to be treated, said tool having connected thereto means for supplying air and soil-rectifying material to the soil; and Fig. 2 an enlarged view in longitudinal section through the operating portion of the tool shown in Fig. 1, showing the said operating portion in position within the soil.

Describing the various parts illustrated by reference characters, A denotes the soil which is to be treated by the tool of the apparatus, the said tool comprising an elongated tubular upper body section 10, the exterior of which is gradually tapered from the upper end to the lower end thereof, where it merges with a reduced cylindrical section 11, an annular shoulder 12 being interposed between the adjacent portions of said sections. The section 11 is provided with discharge outlets or ports 13, and at its lower end is provided with a driving point or spud 14, preferably integral therewith. This spud has a tapered lower end and a cylindrical upper end 14ᵃ of the same diameter as the lower end of the section 10, whereby the hole formed by driving the tool will be provided with a cylindrical wall B surrounding and spaced from the section 11.

The tubular sections 10 and 11 are provided with a bore 15 extending continuously from the top of the former section to and including the latter section. The top of the upper section is provided with an internally threaded opening 16 which registers with the central bore of the tubular portion of the tool and into which there is threaded a pipe 17, the upper end of which is connected to the middle branch of a T 18, to one of the lateral branches whereof a pipe 19 is connected, said pipe being provided with a valve 20 and to which there is connected a hose 21 through which air or other pressure fluid can be supplied to the wall B surrounding the section 11 of the tool. Connected to the opposite lateral branch of the T is a short pipe 22, the end of which is shown as closed by a cap 23 and which is provided with a valve 24. The pipe 22 provides means whereby, if desired, a hose or other conduit may be connected thereto, by removing the cap 23, thus enabling a liquid or gaseous soil-rectifying agent to be introduced into the tool.

With the parts constructed and arranged as described, the tool may be forced into the soil to any desired depth within the limits of its length, the section 10, due to its tapered shape, sealing the coil against the escape of pressure fluid. Air alone, or other pressure fluid, may be supplied through the valve 20 into the annular space surrounding the section 11, being confined within said space by the shoulder 12 and the annular shoulder 14ᵇ at the upper end of the spud 14. The air thus operates upon an area of the wall of the soil surrounding the lower section 11 which, although limited in extent as compared with the entire wall surrounding the tool is of far greater area than the aggregate area which is subjected to air pressure in prior driven tools with which I am familiar. The wall surrounding the section 11 being thus subjected to the pressure of the air, it is quickly disrupted, forming fractures or fissures, such as indicated at C and through which fractures or fissures air is admitted to the soil for the purpose of aerating the same.

If desired to supply air and soil rectifying material simultaneously to the fissures or fractures thus formed, a hose or other suitable conduit for supplying such soil-rectifying material will be connected to the pipe 22 and the valve 24 opened to admit the introduction of the said material into the bore of the tool.

The construction of the tool enables the air and/or soil-rectifying material to be applied to the soil within considerable variations in depth from the surface of the soil, due to the shape of the upper section of the tubular portion of the tool, which serves to effect a seal between the bottom of the said upper section and the surface of the soil thereabove.

From the foregoing description and illustration, it will be evident that I have produced a tool capable of being driven into the soil and which enables the soil to be aerated and/or rectified in a particularly efficient manner.

Having thus described my invention, what I claim is:

A self-tamping aeration tool comprising a tubular body having an upper section and a lower section, the said upper section being gradually tapered from a point adjacent to the top thereof to the bottom thereof and the lower section being of smaller cross sectional area than the upper section and being provided with ports for the discharge of air, the said tool having a point or spud at its lower end connected to the lower section and provided with a tapered lower end, and means connectible with the upper section of said tool for supplying fluid under pressure through the bore thereof and through the ports provided in the lower section, there being a shoulder provided between the lower end of the upper section and the upper end of the lower section and a shoulder provided between the lower end of the lower section and the upper portion of the point or spud, the said shoulders being of substantially the same contour and having substantially the same cross sectional area, the said ports being located between said shoulders.

CHARLES F. IRISH.